(12) United States Patent
Qaisrani et al.

(10) Patent No.: US 12,446,060 B2
(45) Date of Patent: *Oct. 14, 2025

(54) EFFICIENT DISCOVERY OF EDGE COMPUTING SERVERS

(71) Applicant: Apple Inc., Cupertino, CA (US)

(72) Inventors: Babar Qaisrani, Issaquah, WA (US); Teck Yang Lee, Cupertino, CA (US); Rohan C. Malthankar, San Jose, CA (US); Samy Touati, Pleasanton, CA (US); Rafael L. Rivera-Barreto, Miami, FL (US); Vijay Venkataraman, San Jose, CA (US); Krisztian Kiss, Rancho Santa Fe, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,598

(22) Filed: Jun. 20, 2023

(65) Prior Publication Data

US 2023/0422280 A1 Dec. 28, 2023

Related U.S. Application Data

(63) Continuation of application No. 17/205,590, filed on Mar. 18, 2021, now Pat. No. 11,723,056.

(Continued)

(51) Int. Cl.
*H04W 72/54* (2023.01)
*H04W 12/69* (2021.01)
(Continued)

(52) U.S. Cl.
CPC ........... *H04W 72/54* (2023.01); *H04W 12/69* (2021.01); *H04W 24/02* (2013.01); *H04W 48/16* (2013.01); *H04W 48/18* (2013.01)

(58) Field of Classification Search
CPC ..... H04W 72/54; H04W 12/69; H04W 24/02; H04W 48/16; H04W 48/18;
(Continued)

(56) References Cited

U.S. PATENT DOCUMENTS 10,440,096 B2   10/2019  Sabella
11,723,056 B2*   8/2023  Qaisrani ............... H04W 24/02
                                                           370/252

(Continued)

FOREIGN PATENT DOCUMENTS

CN      110198307      9/2019
JP      2017085447     5/2017
(Continued)

OTHER PUBLICATIONS

International Search Report and Written Opinion for PCT/US2021/023118, Jun. 11, 2021.

(Continued)

*Primary Examiner* — Shawn D Miller
(74) *Attorney, Agent, or Firm* — Kowert, Hood, Munyon, Rankin & Goetzel, P.C.

(57) ABSTRACT

Apparatuses, systems, and methods for performing efficient discovery of edge computing servers. A wireless device may provide an edge compute request to an edge discovery service, which may indicate one or more criteria for the edge compute request. The edge discovery service may select one or more edge application servers for the edge compute request based on edge compute resource availability profile information that it stores for multiple edge application servers and the one or more criteria for the edge compute request. The edge discovery service may provide a response to the edge compute request to the wireless device, which may include an indication of the selected edge application server or servers.

20 Claims, 9 Drawing Sheets

Related U.S. Application Data

(60) Provisional application No. 62/993,923, filed on Mar. 24, 2020.

(51) Int. Cl.
*H04W 24/02* (2009.01)
*H04W 48/16* (2009.01)
*H04W 48/18* (2009.01)

(58) Field of Classification Search
CPC . H04W 28/0268; H04W 12/63; H04W 12/71; H04W 12/72; H04W 4/50; H04W 12/06; H04L 47/125; H04L 67/51; H04L 67/10; H04L 41/082; H04L 67/1008; H04L 67/1012
See application file for complete search history.

(56) References Cited

U.S. PATENT DOCUMENTS

| | | |
|---|---|---|
| 2018/0077294 A1 | 3/2018 | Rasanen |
| 2020/0244722 A1 | 7/2020 | Jeuk |
| 2020/0296653 A1 | 9/2020 | Huang |
| 2020/0359218 A1 | 11/2020 | Lee |
| 2020/0366732 A1 | 11/2020 | Trang |
| 2021/0105624 A1* | 4/2021 | Sardesai ............... H04W 4/50 |
| 2021/0120484 A1* | 4/2021 | Thorat ............. H04W 28/0268 |
| 2021/0159981 A1* | 5/2021 | Haag .................. H04L 12/2801 |
| 2021/0243264 A1* | 8/2021 | Yoon ....................... H04L 67/51 |
| 2021/0307018 A1 | 9/2021 | Qaisrani |

FOREIGN PATENT DOCUMENTS

| | | |
|---|---|---|
| WO | 2019126931 | 12/2017 |
| WO | 2018089417 | 5/2018 |
| WO | 2019000414 | 1/2019 |
| WO | 2019236755 | 12/2019 |
| WO | 2020013677 | 1/2020 |
| WO | 2020204474 | 10/2020 |
| WO | 2020231120 | 11/2020 |

OTHER PUBLICATIONS

Office Action for JP Patent Application No. 2022-556570; Aug. 24, 2023.
"3rd Generation Partnership Project; Technical Specification Group Services and System Aspects; Study on application architecture for enabling Edge Applications" (Release 17) 3GPP TR 23.758 V17.0.0; Dec. 2019.
Office Action for IN Patent Application No. 202217050921; Nov. 30, 2023.
Office Action for Chile Patent Application No. 202202514; Sep. 22, 2023. .
Office Action for CN Application No. 202180023665.2; Nov. 11, 2024.
Decision of Grant for JP Pat. App. No. 2022-556570; Sep. 19, 2024.
"3rd Generation Partnership Project; Technical Specification Group Services and System Aspects; Architecture for enabling Edge Applications; (Release 17);" 3GPP TS 23.558 VO.1.2 (Jan. 2020).

* cited by examiner

EFFICIENT DISCOVERY OF EDGE COMPUTING SERVERS

PRIORITY INFORMATION

This application is a continuation of U.S. application Ser. No. 17/205,590, entitled "Efficient Discovery of Edge Computing Servers", filed Mar. 18, 2021, which claims benefit of priority to U.S. provisional patent application Ser. No. 62/993,923, entitled "Efficient Discovery of Edge Computing Servers," filed Mar. 24, 2020, which are hereby incorporated by reference in their entirety as though fully and completely set forth herein.

FIELD

The present application relates to communication devices, and more particularly to a system and method for efficient discovery of edge computing servers in a communication system.

DESCRIPTION OF THE RELATED ART

Wireless communication systems have rapidly grown in usage. In recent years, wireless devices such as smart phones and tablet computers have become increasingly sophisticated. Mobile devices (i.e., user equipment devices or UEs) support telephone calls as well as provide access to the Internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

Despite the rapid technological evolution of mobile user equipment (UEs), computationally demanding applications on a smartphone or tablet are still constrained by limited battery capacity, thermal limits and device cost considerations. To overcome this problem, computationally complex processing can be offloaded to centralized servers, i.e., to the cloud. For example, mobile cloud computing (MCC) refers to servers that provide cloud computing resources for mobile users. However, the use of MCC introduces significant communication delay. Such a delay is inconvenient and makes computational offloading unsuitable for real-time applications.

To solve this problem, the cloud service has been physically moved closer to users, i.e., toward the "edge" of the network. The concept of Multi-access Edge Computing (MEC), also referred to as "Mobile Edge Computing," or simply "Edge Computing," refers to an evolution of cloud computing that brings application hosting from centralized data centers down to the "network edge," i.e., physically closer to consumers and the data generated by applications. Edge computing is acknowledged as one of the key components for meeting the performance demands of modern cellular networks, such as 5G networks, especially with respect to reducing latency, offloading heavy compute operations, and improving bandwidth efficiency. As developments in edge computing are ongoing, improvements in the field are desired.

SUMMARY

Embodiments are presented herein of apparatuses, systems, and methods for efficient discovery of edge computing servers in a communication system.

According to the techniques described herein, a communication device, such as a user equipment device (UE), may request access to an edge compute resource via an edge discovery service, e.g., that may be provided by a cellular network. The edge compute request may include application and/or device specific criteria for the edge compute request, which may assist the edge discovery service to select an edge application server (or multiple edge application servers) that may be able to fulfill the edge compute request. For example, the edge compute request could include an indication of a set of edge compute resources and/or other parameters that the device needs to support execution of a specific application or application task at the device. The set of edge compute resources and/or other parameters could be indicated directly, or may be indirectly indicated by specifying the application or application task associated with the edge compute request, based on which the edge discovery service may be able to determine the set of edge compute resources and/or other parameters using an application profile stored by the edge discovery service.

The edge discovery service may attempt to match the criteria for the edge compute request with the edge compute resources and/or other parameters available from various edge application servers for which the edge discovery service provides discovery services. Based on such attempted matching (and possibly any of various other considerations), the edge discovery service may select one or more of the edge application servers to suggest to the device to potentially fulfill the edge compute request. The edge discovery service may respond to the edge compute request with an indication of the selected edge application server(s), which may assist the device to connect to an edge application server that can meet its edge compute needs.

The edge discovery service may also store, and update as needed, information indicating the available edge compute resources and/or other parameters for each of the edge application servers for which it provides discovery services. This may include (e.g., synchronously or asynchronously) receiving periodic and/or aperiodic updates (which may be requested by the edge discovery service or provided autonomously) from each such edge application server.

In some instances, e.g., based on such updates and/or for any of a variety of other possible reasons, the edge discovery service may decide to modify its selection of which edge application server(s) may best meet the criteria for an edge compute request of a device. In such a scenario, the edge discovery service may provide an indication of the (e.g., modified) selected edge application server(s) to the device, which may assist the device to change which edge application server it connects with to obtain edge compute resources to better meet its edge compute needs, at least in some instances.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

Figure 1:
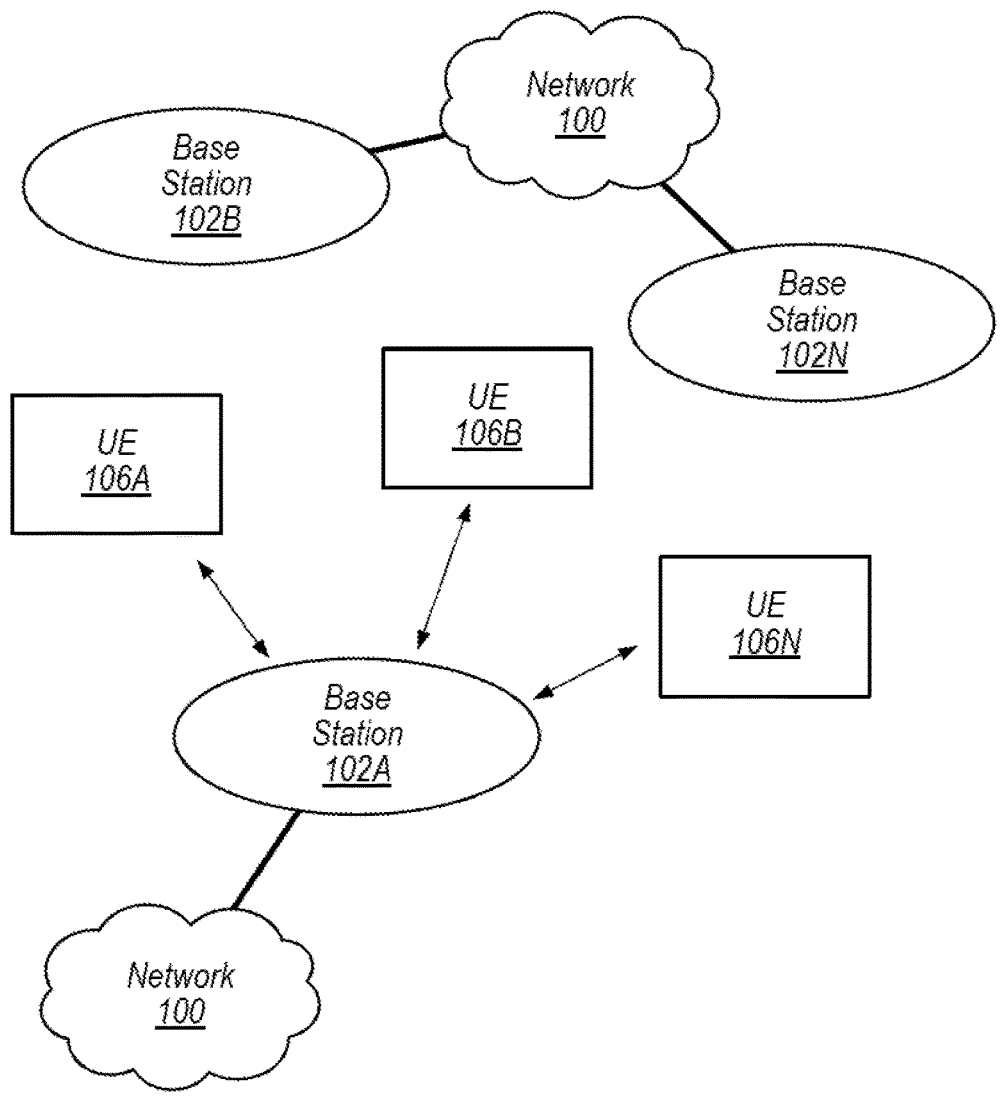
FIG. 1 illustrates an example (and simplified) wireless communication system according to some embodiments.

While the subject matter described herein is susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
DL: Downlink
UL: Uplink
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
MCC: Mobile Cloud Computing
MEC: Mobile Edge Computing (or Multi-access Edge Computing)
VR: Virtual Reality
AR: Augmented Reality
XR: Extended Reality
PUSCH: Physical Uplink Shared Channel
PDCCH: Physical Downlink Control Channel
FQDN: Fully Qualified Domain Name
URL: Uniform Resource Locator
IP: Internet Protocol Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™ Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
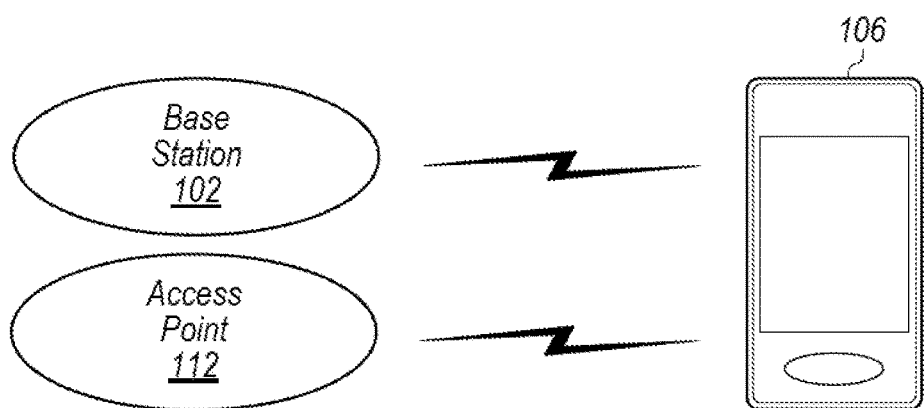
FIG. 2 illustrates an example of a base station (BS) and an access point (AP) in communication with a user equipment (UE) device according to some embodiments.

FIGS. 1 and 2—Exemplary Communication System

FIG. 1 illustrates a simplified example wireless communication system in which aspects of this disclosure may be implemented, according to some embodiments. It is noted that the system of FIG. 1 is merely one example of a possible system, and embodiments may be implemented in any of various systems, as desired.

As shown, the example wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices. The UE devices are examples of wireless devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'.

The communication area (or coverage area) of the base station may be referred to as a "cell." The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. In particular, the cellular base station 102A may provide UEs 106 with various telecommunication capabilities, such as voice, SMS and/or data services.

As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a 5G core (5GC) network (which may alternatively be referred to as a NR core (NRC) network). In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 and an access point 112, according to some embodiments. The UE 106 may be a device with cellular communication capability and also non-cellular communication capability (e.g., Bluetooth, Wi-Fi, and so forth) such as a mobile phone, a hand-held device, a computer, a laptop, a tablet, a smart watch or other wearable device, an unmanned aerial vehicle (UAV), an unmanned aerial controllers (UAC), an automobile, or virtually any type of wireless device.

The UE 106 may include a processor (processing element) that is configured to execute program instructions stored in memory. The UE 106 may perform any of the embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the embodiments described herein, or any portion of any of the embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT, or LTE or GSM), and separate radios for communicating using each of Wi-Fi and Bluetooth. Other configurations are also possible.

Figure 3:
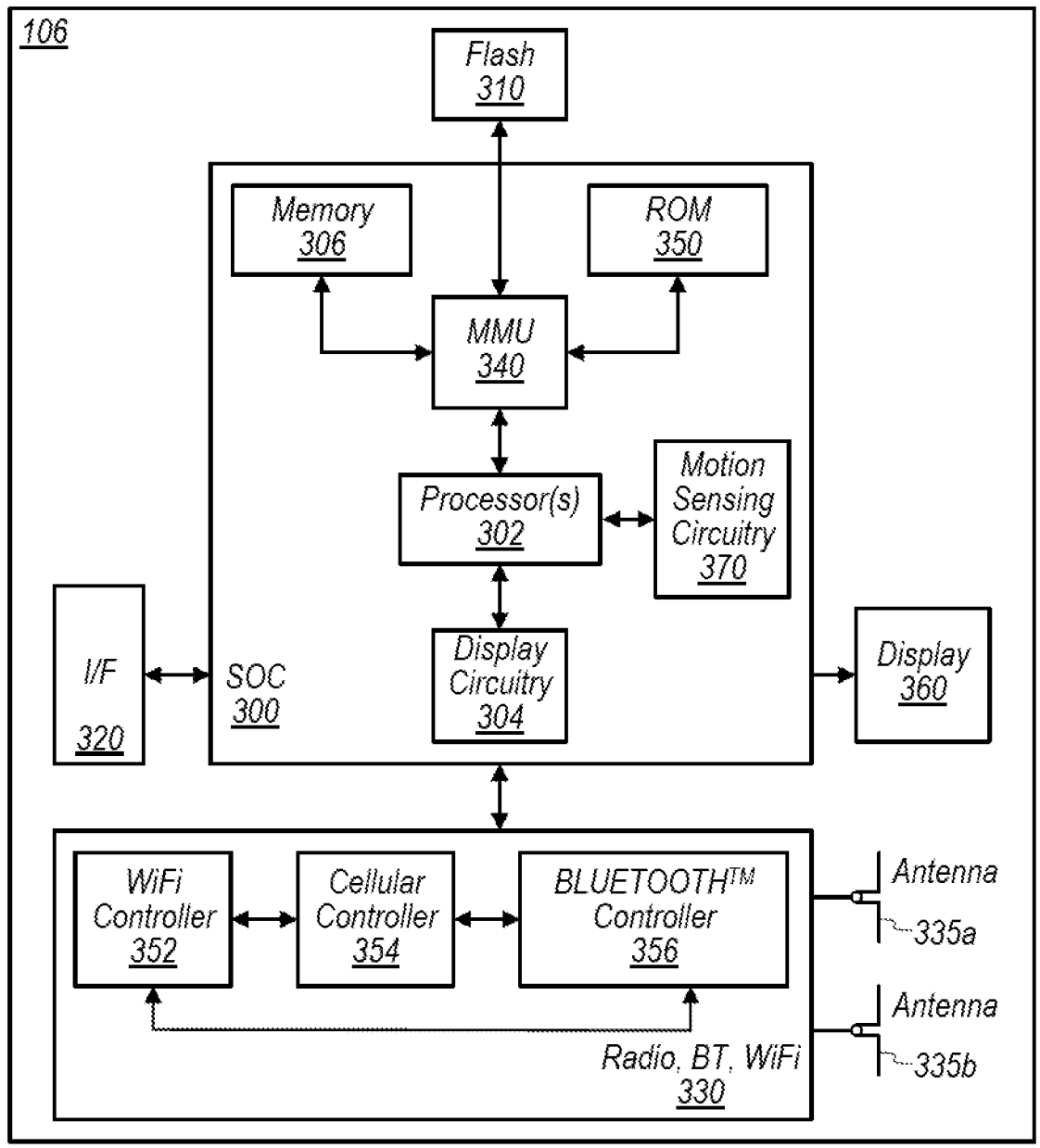
FIG. 3 illustrates an example block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor (s) 302 and translate those addresses to locations in memory (e.g., memory 306, read only memory (ROM) 350, Flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform efficient discovery of edge computing servers in a cellular communication system such as described further subsequently herein. The processor(s) 302 of the UE device 106 may be configured to implement part or all of the methods or operations described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Figure 4:
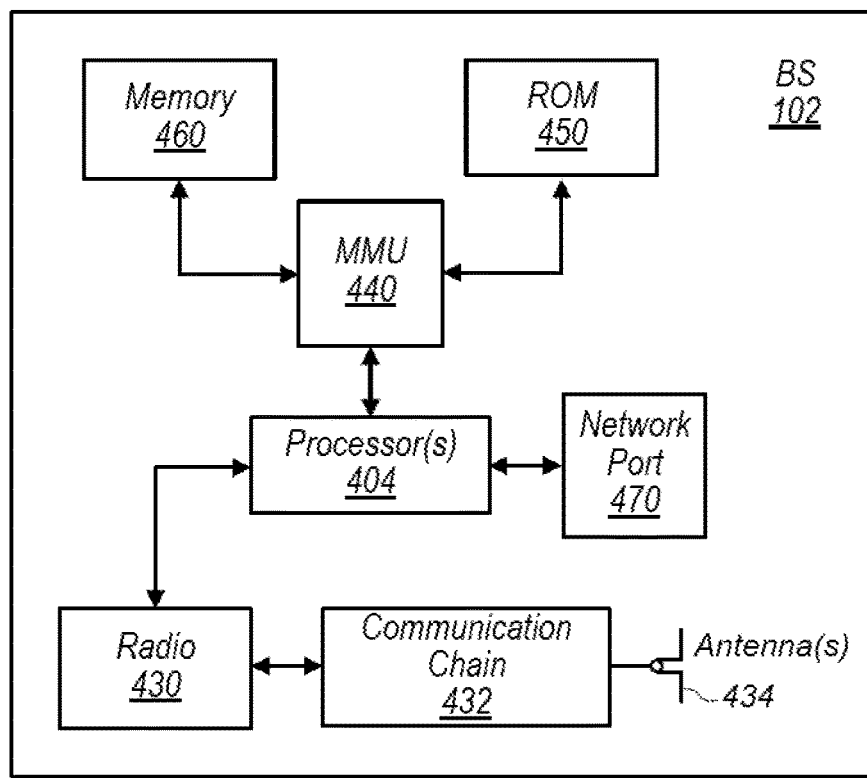
FIG. 4 illustrates an example block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Figure 5:
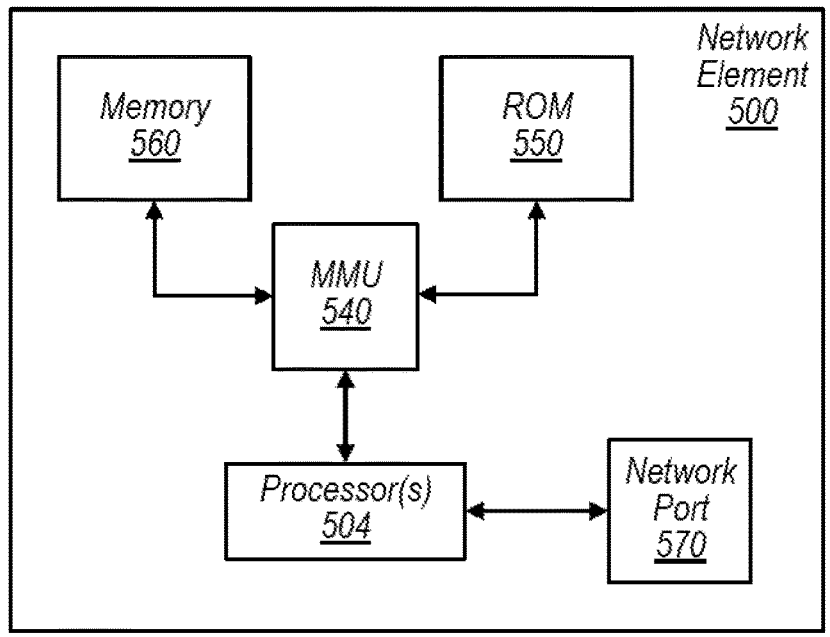
FIG. 5 illustrates an example block diagram of a cellular network element, according to some embodiments.

FIG. 5— Exemplary Block Diagram of a Network Element

FIG. 5 illustrates an exemplary block diagram of a network element 500, according to some embodiments. According to some embodiments, the network element 500 may implement one or more logical functions/entities of a cellular core network, such as a mobility management entity (MME), serving gateway (S-GW), access and management function (AMF), session management function (SMF), Edge Discovery Service (EDS), edge application server (EAS), etc. It is noted that the network element 500 of FIG. 5 is merely one example of a possible network element 500. As shown, the core network element 500 may include processor(s) 504 which may execute program instructions for the core network element 500. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The network element 500 may include at least one network port 570. The network port 570 may be configured to couple to one or more base stations and/or other cellular network entities and/or devices. The network element 500 may communicate with base stations (e.g., eNBs/gNB s) and/or other network entities/devices by means of any of various communication protocols and/or interfaces.

As described subsequently herein, the network element 500 may include hardware and software components for implementing and/or supporting implementation of features described herein. The processor(s) 504 of the core network element 500 may be configured to implement or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

The block diagram of FIG. 5 may also be representative of a server computer (possibly located outside of a cellular network) that may implement a portion or all of the operations described herein; for example, in some instances, an EDS or an EAS such as described herein may be implemented by such a server computer.

FIGS. 6-11—Multi-Access Edge Computing and Edge Discovery

FIGS. 6-11 illustrate various aspects of possible techniques for performing edge discovery in a cellular communication system. It should be noted, however, that the exemplary details illustrated in and described with respect to FIGS. 6-11 are not intended to be limiting to the disclosure as a whole: numerous variations and alternatives to the details provided herein below are possible and should be considered within the scope of the disclosure.

Modern cellular devices are being asked to perform increasingly complex applications. In general, users prefer the use of smartphones (UEs) due to their portability, size and ease of use. However, being portable or mobile devices, UEs such as smartphones are battery-powered and have a small size relative to non-portable devices such as desktop computers. Additionally, cellular communication capability is increasingly being provided with other types of UE devices, such as virtual reality (VR) or augmented reality (AR) devices (e.g., headsets, etc.), gaming accessories, appliances, etc., at least some of which may also have constraints with respect to form factor, power consumption, and/or cost. Thus, UE devices may have various hardware limitations, such as battery life, power, processing ability, and memory capacity. In order to reduce the load of applications running on UE devices, and also to provide for more efficient use of UE resources, efforts have been made to offload the computational requirements of the UE to another computing resource. As mentioned above, the term "Mobile Cloud Computing" (MCC) refers to the use of cloud servers to perform computational tasks that may otherwise be performed by a UE. However, as described above, the use of cloud servers that are physically remotely located from the UEs they are attempting to assist (the UEs from which they are attempting to offload tasks) may introduce communication delays that make such cloud servers unsuitable for real time applications.

Multi-access Edge Computing (MEC) provides an information technology (IT) service environment and cloud computing capabilities at the edge of the mobile network, within the Radio Access Network (RAN) and in close proximity to mobile subscribers. In other words, MEC operates to locate mobile cloud computing (MCC) services closer to mobile users (closer to the "edge" of the network), to reduce communication delays. Specific user requests may thus be managed directly at the network edge, instead of forwarding all traffic to remote Internet services that are located further away. MEC promises significant reduction in latency and mobile energy consumption while delivering highly reliable and sophisticated services.

In a MEC system as described herein, a computing task from a UE may be offloaded to a nearby edge application server via the cellular network. An edge discovery service, e.g., which may be provided by the cellular network, may facilitate discovery and selection of an appropriate edge application server to handle the edge computing request of the UE, which can relate to any of a broad spectrum of use cases and applications.

As noted above, the UE has limited computation capability and may suffer additional incurred latency during task offloading. As a result, the UE may utilize efficient resource allocation for local computation and careful selection of tasks to be offloaded via wireless transmission, e.g., if the executed applications are latency-sensitive or mission-critical.

Embodiments described herein provide techniques for efficient discovery of edge computing servers. Embodiments are described herein in the context of cellular systems (e.g., 3GPP-based systems). However, the embodiments described herein may be readily extended to non-cellular (e.g., non-3GPP-based) systems, such as Wi-Fi based wireless communication systems, among various possibilities. Additionally, note that it may be the case that embodiments described herein as being performed by wireless devices can also be performed by wired communication devices (such as devices that can connect to a wireless hotspot in a wired manner, as one example), among various possible communication devices, at least according to some embodiments.

Figure 6:
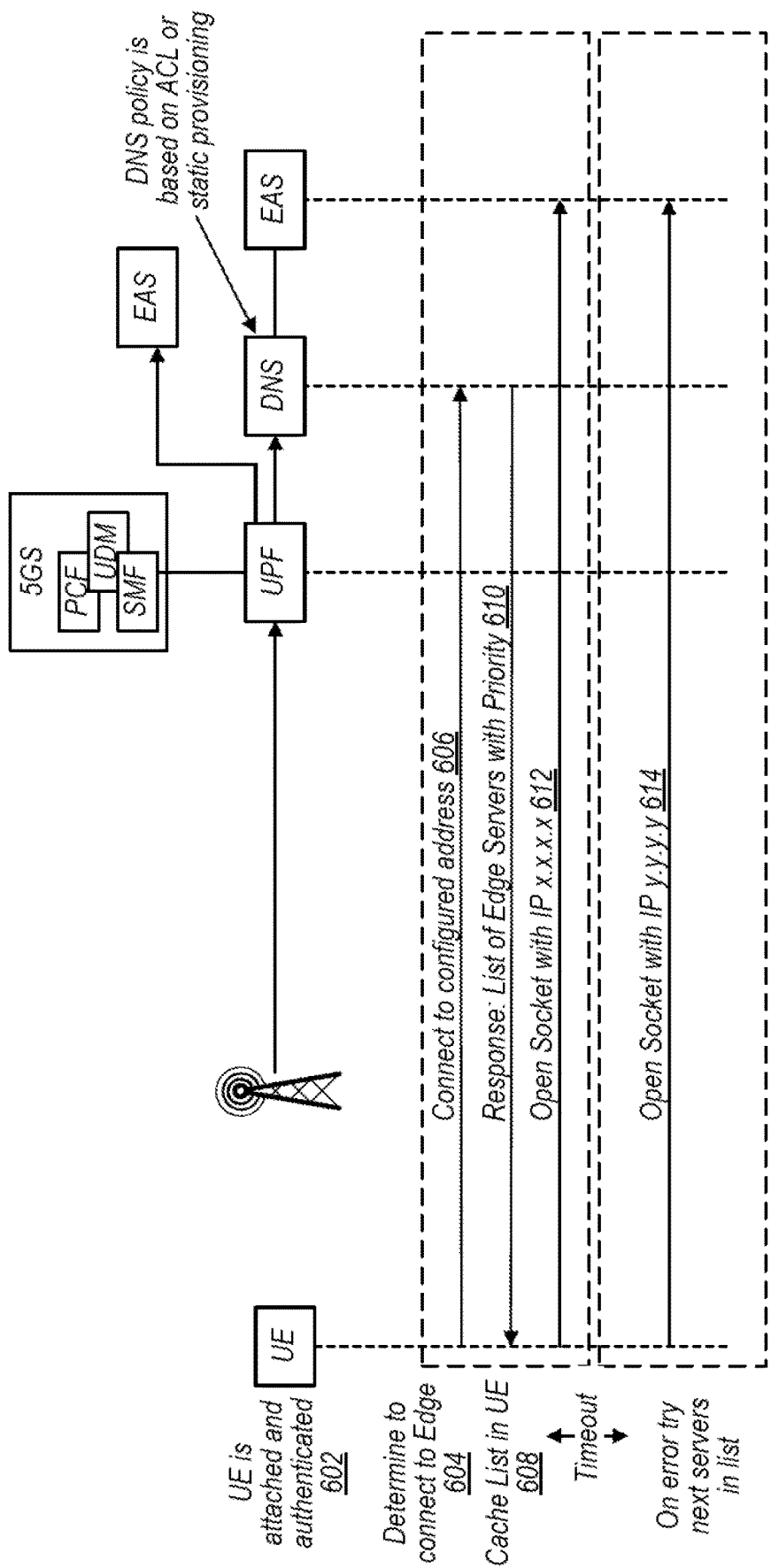
FIG. 6 is a communication flow diagram illustrating one possible approach to performing edge discovery in a wireless communication system, according to some embodiments.

FIG. 6 illustrates one possible approach to performing edge discovery in a cellular communication system, in which a domain name service (DNS) server is used to resolve requests for edge compute resources from wireless devices in the cellular network, according to some embodiments. As illustrated, in 602, a UE may attach to and authenticate with a 5GS network via a wireless link with a cellular base station, e.g., including control plane establishment and obtaining a valid IP (e.g., IPv6) address. The UE may be pre-configured with a static URL for connecting to edge resources as part of carrier build and/or over the air (OTA) updates for the UE.

In 604, the UE may determine to utilize edge computing resources, and so, in 606, the UE may attempt to connect to a designated address (e.g., the configured URL) for connecting to edge computing resources, e.g., via a user plane function (UPF) of the cellular network. In 608, a DNS server may respond with a list of edge servers, which may be selected and prioritized according to DNS policy, e.g., based on access control list (ACL) or static provisioning. In 610, the UE may cache the list, and, in 612, may attempt to open socket with a first (e.g., highest priority) edge server indicated by the DNS server. If an error (e.g., timeout) occurs for that attempt, in 614, the UE may try the next edge server from the list.

It may be the case that the DNS server utilizes Internet Control Message Protocol (ICMP) to ping the edge application servers to check their status (up/down) to help determine the list of edge servers to provide to an edge client (e.g., UE). However, it may be the case that such queries do not provide information on the load of a node.

It may also be possible for load balancers to be used, e.g., including using scripts to collect management (e.g., simple network management protocol (SNMP), which may provide management information such as memory and CPU utilization of a device/machine) based load information to make decisions on onwards routing. For example, an edge client could route packets to a load balancer, and the load balancer may redirect the packets to a server, e.g., based on load; however, as SNMP may be based on management interface, rather than traffic, it may be the case that such operation may not always best meet the needs of the edge client.

Accordingly, there may be benefits to providing a mechanism to transfer information about the status and load/latency related information for candidate edge application servers back to the edge client, e.g., to improve the ability of the client to decide to which edge application server to connect, and/or to update the edge client on changes in the server (e.g., for facilitating edge re-location) relative to the approach illustrated in FIG. 6.

According to some embodiments, to provide such a mechanism, two new entities may be introduced. One may include an edge discovery service (EDS), which may be deployed within the carrier network to facilitate the selection of edge compute resources based on specified criteria. Another may include a device offload facilitator (DOF) function, which may operate in a wireless device to facilitate and interact with the EDS to make offloading decisions on behalf of the wireless device.

Figure 7:
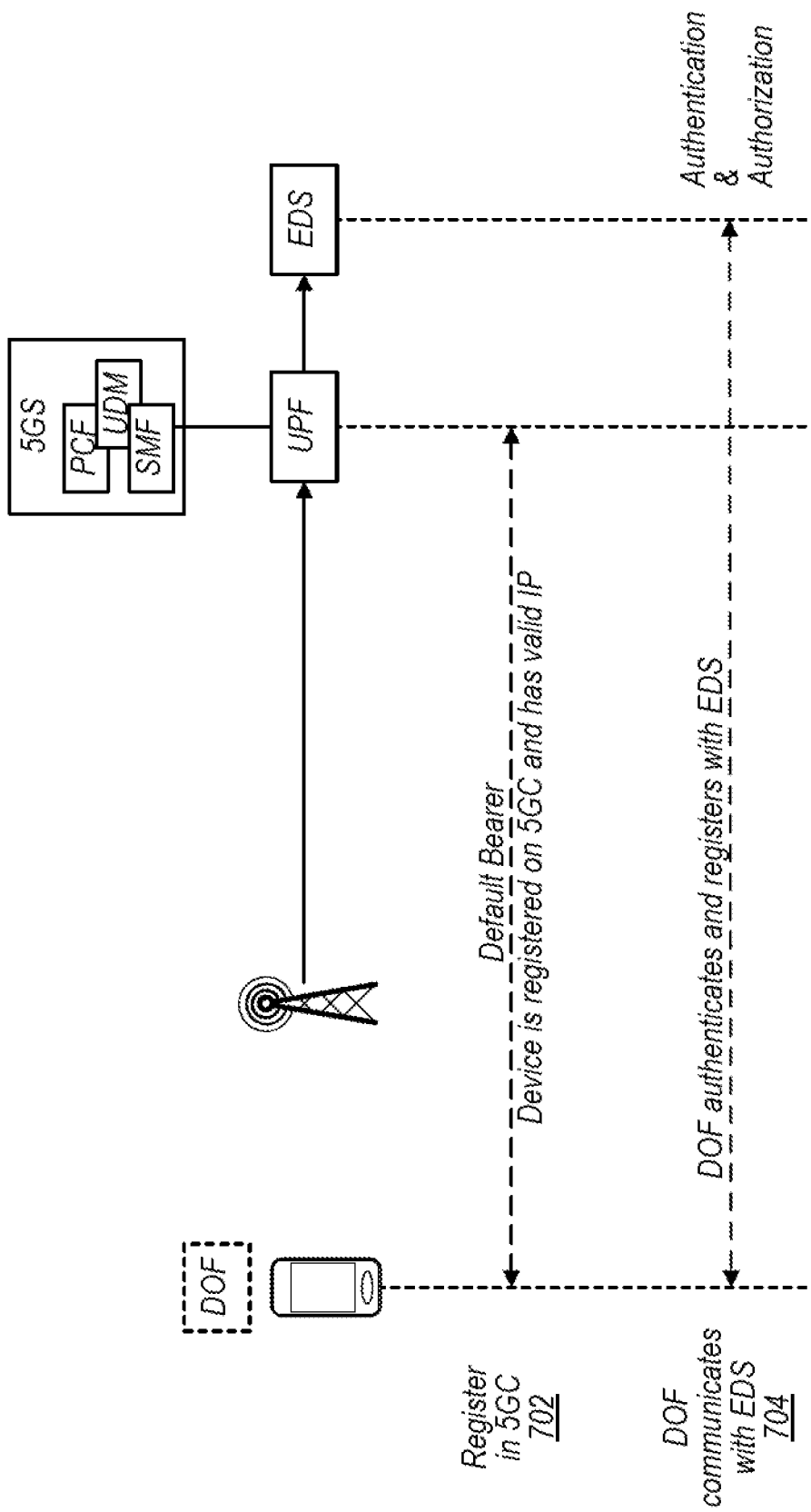
FIGS. 7-8 are communication flow diagrams illustrating communications that might be performed in support of performing edge discovery in a wireless communication system, according to some embodiments.

FIG. 7 illustrates is a communication flow diagram illustrating certain "pre-provisioning" aspects of such a possible approach to performing efficient edge discovery in a cellular network, according to some embodiments. In particular, the method of FIG. 7 illustrates possible techniques for performing authentication and authorization between the DOF function of a wireless device and an EDS. As shown, in 702, the wireless device may initially register with a 5G core (5GC) network for 5G service (5GS), including establishing a default bearer and obtaining a valid IP address to communicate with a UPF of the 5GC network. In 704, the DOF function of the wireless device may then communicate with the EDS (e.g., via the UPF) to authenticate and register with the EDS. In some instances, it may be possible that authentication performed with the 5GC network maybe honored by an EDS, e.g., if there is a trust relationship between EDS and 5GS. In some embodiments, there may be a token shared between two entities to authenticate such a request/relationship. It may be the case that the DOF function can be pre-configured with information indicating an address of the EDS, or that the DOF function may be able to learn this information out of band. The DOF function of the wireless device may also request and obtain authorization to use edge application servers from the EDS, e.g., for compute offloading for applications. The authorization may be based on any or all of a wireless device type and/or identifier of the wireless device, a subscriber identity (e.g., international mobile subscriber identity (IMSI) or other type of subscriber identity) of the wireless device, an application or application type for which the wireless device requests to be authorized to use edge compute resources, certificate based authentication, and/or any of various other possible considerations.

Figure 8:
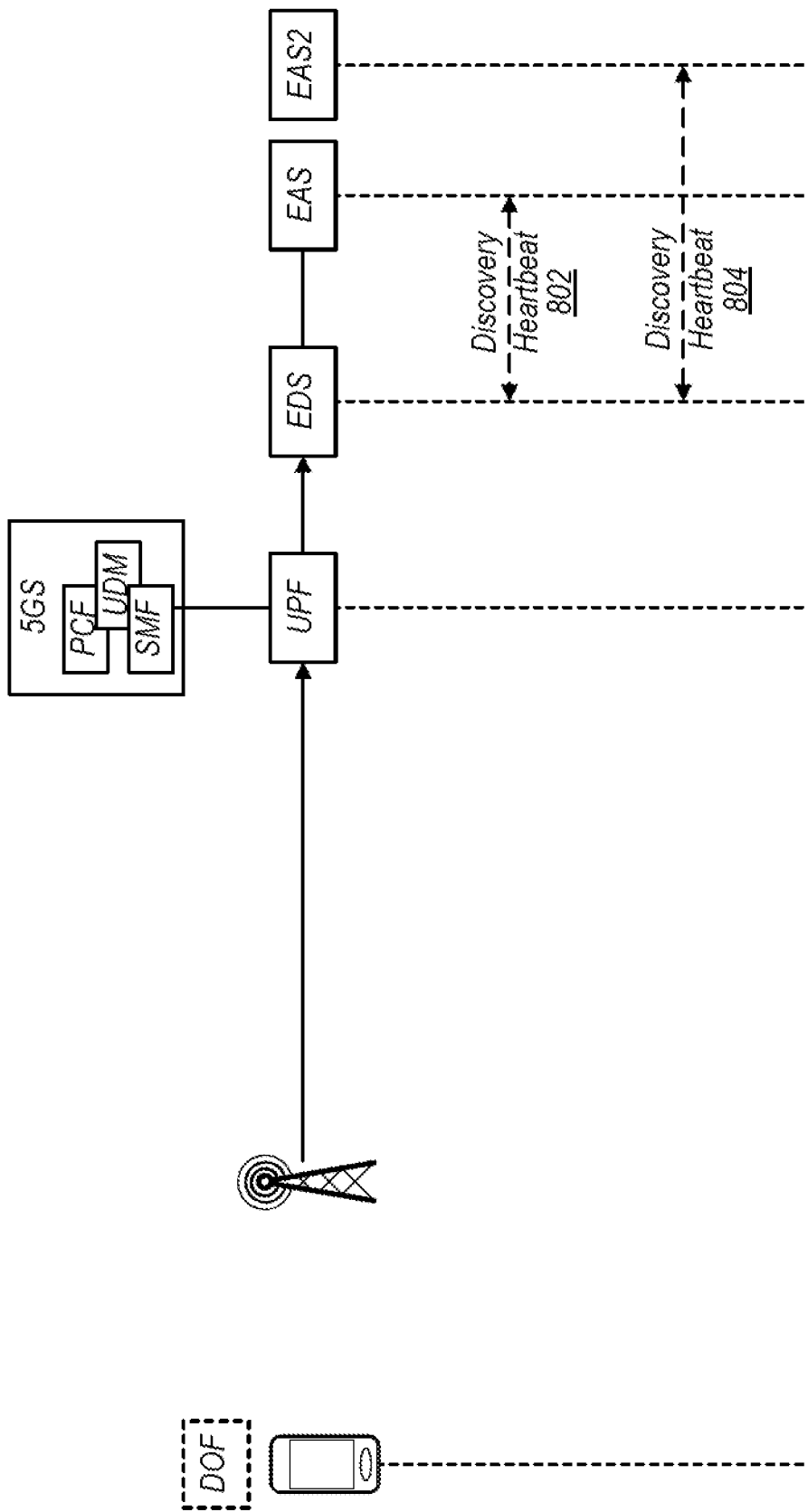

FIG. 8 illustrates is a communication flow diagram illustrating certain further pre-provisioning aspects of such a possible approach to performing efficient edge discovery in a cellular network, according to some embodiments. In particular, the method of FIG. 8 illustrates possible techniques for the EDS to obtain and maintain capability and/or performance information for available edge application servers. As shown, in 802 and 804, the EDS may perform discovery and/or receive heartbeat information from each of multiple edge application servers (EASs). Such an exchange of discovery/heartbeat information may be performed in any of various ways. For example, the EDS may request edge compute resource availability information from each of the EASs, and the EASs may respond to the requests. In some instances, an EAS may provide an update regarding its capability/performance in a (e.g., scheduled persistent or semi-persistent) periodic manner. As another possibility, an EAS may provide an update regarding its capability/performance in response to an update request from the EDS. As a still further possibility, an EAS may provide an update regarding its capability/performance in response certain configured triggers, such as a change (possibly of at least a certain magnitude) in the capability/performance of the EAS, or a change in the up/down status of the EAS. Note that any or all of such mechanisms for keeping the EDS updated with respect to the capability/performance of the EASs tracked by the EDS may be used, among others, as desired.

Figure 9:
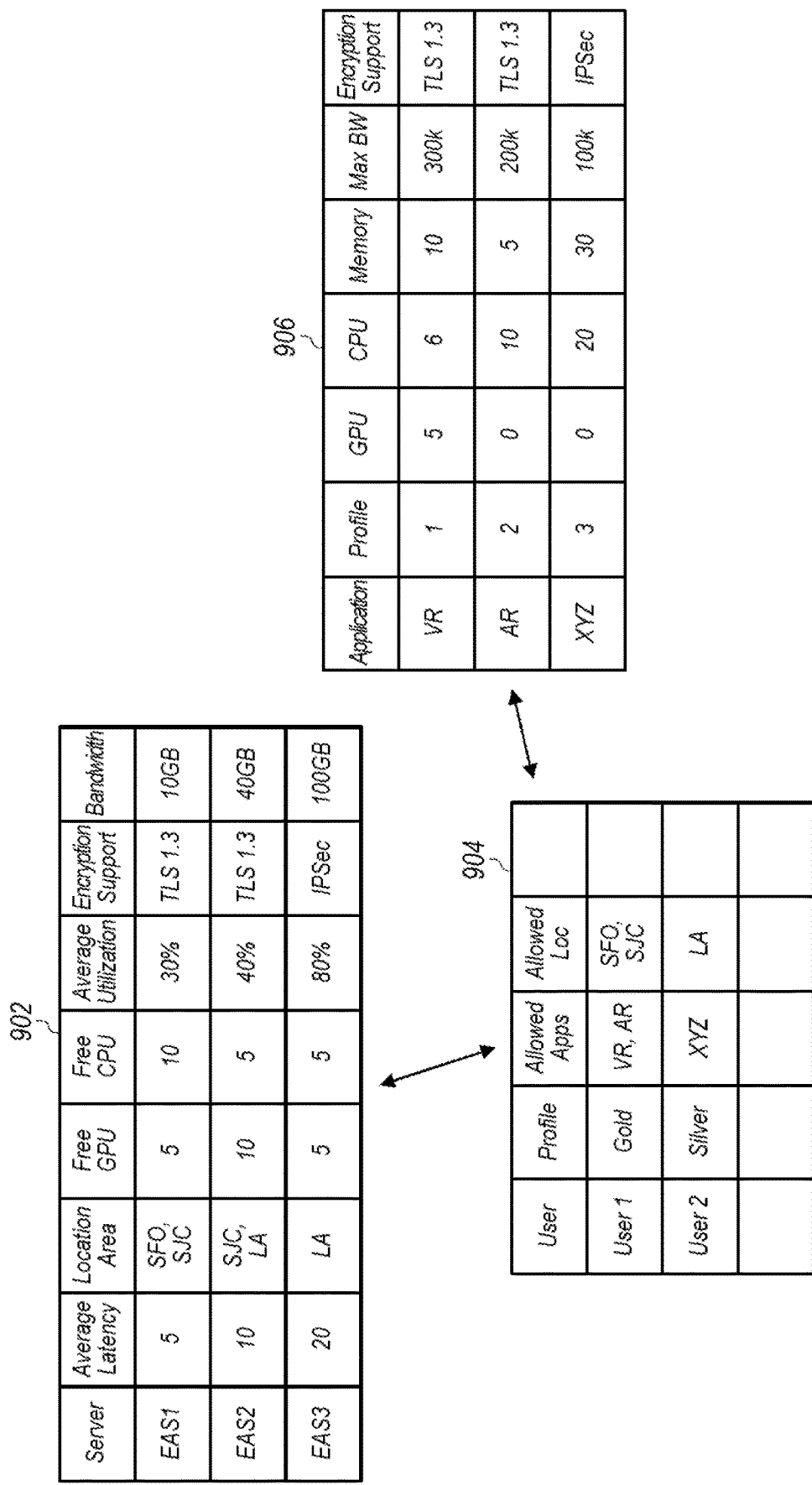
FIG. 9 illustrates tables that could be used as part of performing efficient edge discovery, according to some embodiments.

In some instances, the EDS may maintain one or more discovery/profile tables and/or may otherwise store information relating to the EASs tracked by the EDS, users and/or wireless devices registered with the EDS, and/or applications for which edge compute resources may be requested from the EDS. FIG. 9 illustrates several examples of such possible tables, according to some embodiments.

As shown, one possible table 902 may include edge compute resource availability profile information for each of multiple edge application servers. In the illustrated example, such a table may include information identifying each EAS and indicating average latency, location area, available GPU resources, available CPU resources, average utilization of the EAS, type(s) of encryption supported by the EAS, and bandwidth available for the EAS.

Another illustrated example table 904 may include user profile information for each of multiple users registered with the EDS. In the illustrated example, such a table may include information identifying each user and indicating a profile type, allowed applications, and allowed locations for the user. Some or all of such information may be obtained when registering a wireless device with the EDS, as one possibility. Additionally, or alternatively, some or all of such information may be obtained when receiving an edge compute request from a wireless device, according to some embodiments.

A further illustrated example table 906 may include application profile information for each of multiple applications or application types. In the illustrated example, such a table may include information identifying each application or application type and indicating a profile identifier, an amount of GPU resources associated with the application/application type, an amount of CPU resources associated with the application/application type, an amount of memory resources associated with the application/application type, and an amount of bandwidth associated with the application/application type. Note that the GPU, CPU, memory, and BW resource amounts may include typical amounts used for the application/application type, maximum amounts used, and/or any other amount(s) associated with the application/application type, according to various embodiments.

Note that in each of the illustrated tables of FIG. 9, the illustrated fields are provided as non-limiting examples, and that any number of fields may differ (e.g., additional fields may be included, one or more illustrated fields may be omitted or implemented in a different manner, etc.) from the illustrated table. For example, though not shown, note that in some instances an application profile table could also or alternatively include a field for indicating type(s) of encryption supported by the application/application type. Additionally, note that the illustrated values for each of the illustrated tables are merely examples of various possible values, and numerous other values and/or ranges of values may also be possible.

Figure 10:
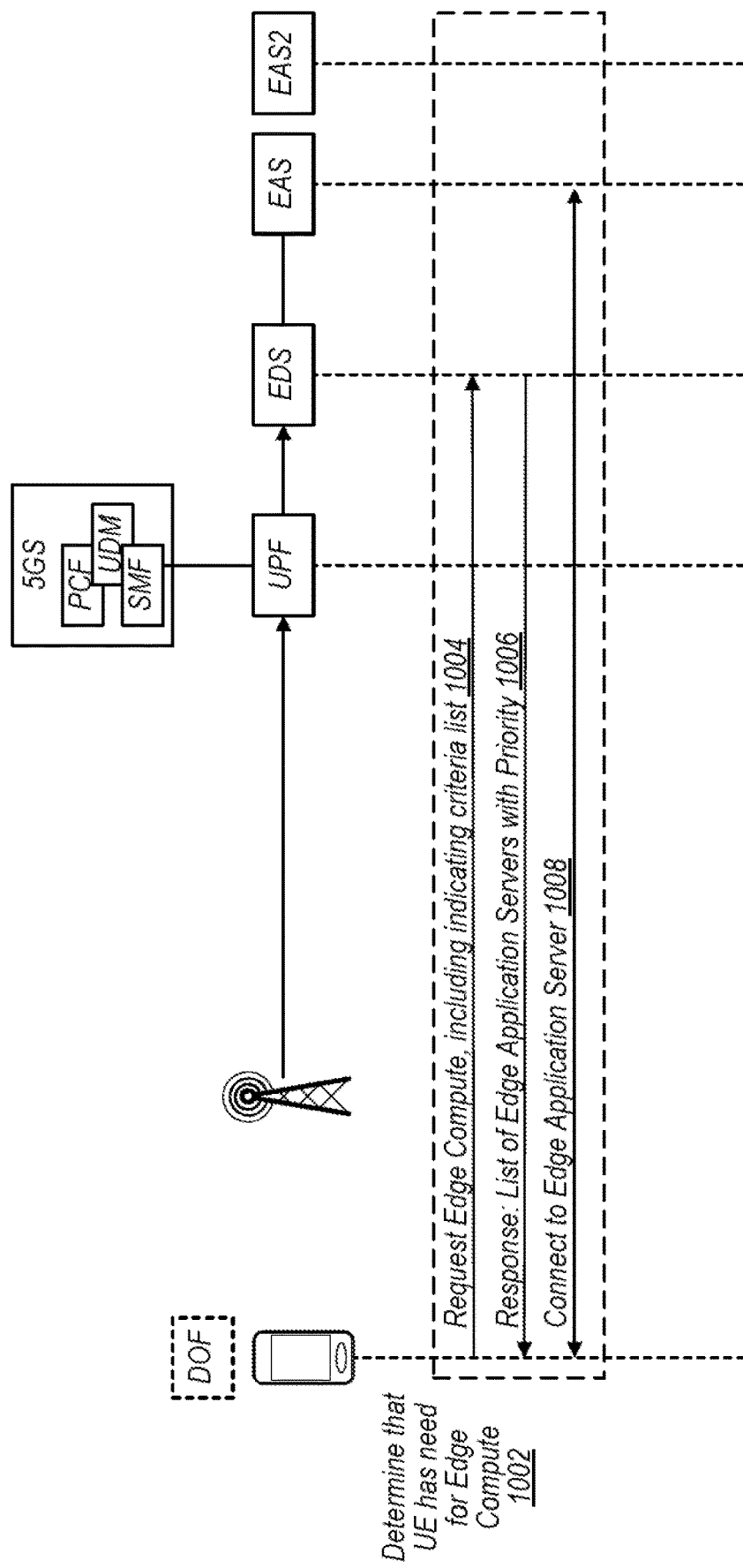
FIG. 10 is a communication flow diagram illustrating another possible approach to performing edge discovery in a wireless communication system, according to some embodiments.

FIG. 10 is a communication flow diagram illustrating a scenario in which an EDS and a DOF function are used to facilitate performing efficient edge discovery in a wireless communication system, according to some embodiments. At least according to some embodiments, the method of FIG. 10 may be used in conjunction with either or both of the methods of FIGS. 7-8, and/or in conjunction with the tables (or other data structures containing similar information) illustrated in FIG. 9, if desired. For example, prior to the steps of FIG. 10, the UE may register with the 5GC network and the DOF may perform authentication and authorization with the EDS, the EDS may obtain discovery/heartbeat information from each of multiple edge application servers, and the EDS may populate an EAS table with edge compute resource availability profile information, a user table with user profile information, and an application table with application profile information, at least according to some embodiments.

As shown, in 1002, the DOF function of the UE may determine that the UE has a need for edge compute. For example, the UE may be executing an application with processing and/or memory demands that are sufficient to invoke DOF and the DOF function may determine that the UE would benefit from the use of edge compute resources.

In 1004, the DOF function of the UE may provide an edge compute request to the EDS. The edge compute request may indicate one or more criteria for the edge compute request. Based at least in part on the criteria for the edge compute request, and on stored capability and performance information (e.g., edge compute resource availability profile information) for each of multiple EASs, the EDS may select one or more EASs for the edge compute request. The selection of the EAS(s) may be intended to select one or more EASs that can support the criteria indicated for the edge compute request, and may include prioritization (e.g., if multiple EASs are selected) of those EASs, e.g., in order of best match to the indicated criteria, as may be determined by the EDS in any of various ways.

The criteria may be specific to the wireless device (e.g., device type) and/or an application for which the edge compute request is being provided. For example, in some embodiments, the criteria may be based at least in part on the application or application type (and possibly a specific application task) for which the edge compute request is being provided. In some instances, the criteria may include an indication of the application, application type, and/or application task, e.g., which may be used in conjunction with application profile information stored by the EDS, which may indicate a set of edge compute resources associated with the application/application type/application task. In such a scenario, the EDS may determine which of the EASs for which it has capability and performance information could provide the highest proportion of the set of edge compute resources associated with the application/application type/application task, and select one or more EASs based at least in part on such a determination.

Additionally or alternatively, the one or more criteria for the edge compute request could directly include an indication of one or more types and amounts of edge compute resources and/or other requirements associated with the edge compute request, such as a graphics processing unit (GPU) capability, a central processing unit (CPU) capability, an amount of memory, a geographic location, a device type (e.g., phone, watch, other devices, etc.), an amount of bandwidth, and/or a latency budget associated with the edge compute request. In such a scenario, the EDS may determine which of the EASs for which it has capability and performance information could provide the highest proportion of the set of edge compute resources and/or other requirements associated with the edge compute request, and select one or more EASs based at least in part on such a determination.

As another example, in some instances, the one or more criteria for the edge compute request could include one or more authentication types associated with the edge compute request. In such a scenario, the EDS may determine which of the EASs for which it has capability and performance information could provide the indicated authentication type(s), and select one or more EASs based at least in part on such a determination.

As a still further example, the one or more criteria for the edge compute request could include one or more network slices (e.g., network slice selection assistance information (NSSAI)) associated with the edge compute request. The requested NSSAI can be optionally pre-provisioned or provided by 5GC as part of a Registration request/response. In such a scenario, the EDS may determine which of the EASs for which it has capability and performance information could provide support for the indicated network slice(s), and select one or more EASs based at least in part on such a determination. In some instances, in such a scenario, or potentially in various other scenarios, the EDS may instruct the wireless device to connect to a specific network slice, e.g., in order to support communication between the wireless device and the EAS meeting specific criteria.

As a still further example, based at least in part on the criteria, the EDS may communicate with the underlying network (e.g., with 5GC nodes or other core network elements) to coordinate the Quality of Service (QoS) parameters (e.g., QoS Class Identifier (QCI) or QoS Flow Identifier (QFI), data network name (DNN), allocation and retention priority (ARP), and/or differentiated services code point (DSCP)), e.g., in order to provide support for low latency experience, at least according to some embodiments.

In 1006, the EDS may provide a response to the edge compute request to the wireless device. The response to the edge compute request may include a (e.g., prioritized) list of the selected EAS(s), e.g., including FQDN/URL/IP address(es) for each EAS indicated. In some instances, the response may (e.g., additionally or alternatively) include (e.g., partial or full) capability and/or performance information for each selected EAS, e.g., which may be used by the DOF function of the wireless device to determine to which of the indicated EASs to attempt to connect.

Note that, at least in some instances, the EDS may also pass on packet core parameters such as UE route selection policy (URSP), UE policy section identifier (UPSI), DNN, NSSAI, etc., to the DOF function.

In 1008, the wireless device may send traffic (user/control plane) to one of the indicated EASs. In some instances, the wireless device may first attempt to connect to a highest prioritized EAS, e.g., based on a priority order provided by the EDS and/or according to its own determination of a priority order of the indicated EASs. If the attempt to connect to that EAS is unsuccessful, the wireless device may attempt to connect to a next highest prioritized EAS, and so on, at least according to some embodiments.

Figure 11:
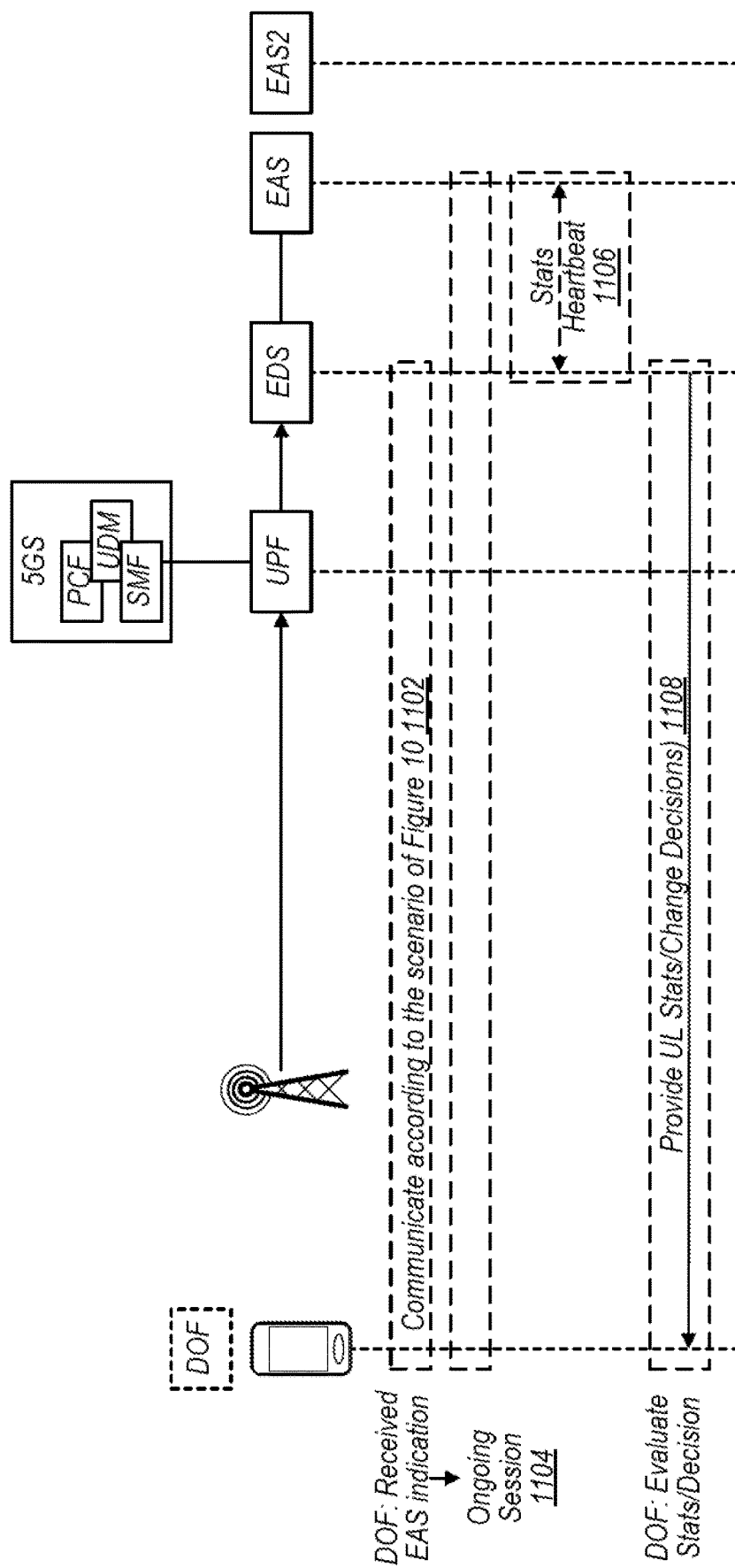
FIG. 11 is a communication flow diagram illustrating a possible approach to performing efficient edge discovery maintenance in a wireless communication system, according to some embodiments.

Note that in some instances, the capability and/or performance information for an EAS may change over time; for example, more edge compute resources may become available as utilization of the EAS decreases, or fewer edge compute resources may be available as utilization of the EAS increases. In some instances, location changes (e.g., due to device mobility) may also or alternatively impact how well an EAS meets the edge compute needs of a wireless device. Accordingly, it may also be useful to provide a mechanism to support updating the decision regarding from which EAS to obtain edge compute resources for a wireless device. FIG. 11 is a communication flow diagram illustrating aspects of such a mechanism, according to some embodiments.

As shown, in 1102, the wireless device may communicate with the EDS according to the scenario illustrated in FIG. 10 to receive information indicating one or more suggested/prioritized EASs, and in 1104, may have established an ongoing edge compute session with an EAS.

In 1106, the EDS may receive updated statistics and/or heartbeat information from the EAS. The information may include updated capability and performance information (e.g., edge compute resource availability information) for the EAS. The updated statistics and/or heartbeat information may include information at any of various levels of granularity. As one possibility, the information may include an update regarding the status of the EAS level capability and performance. As other (e.g., additional or alternative) possibilities, the information may include wireless device specific EAS performance statistics, application or application task specific performance statistics, stream specific performance statistics, etc.

Note that, as one possibility, the EDS may receive the updated statistics and/or heartbeat information from the EAS based on a scheduled periodic (e.g., persistent or semi-persistent) update configured between the EDS and the EAS. For example, the EDS may configure periodic heartbeat updates from each EAS for which it maintains edge compute resource availability profile information, such that the update could be triggered autonomously by the EAS in accordance with a scheduled periodic heartbeat update. As another possibility, the EDS may request the updated statistics and/or heartbeat information from the EAS, such that the update could be provided by the EAS in response to the request for the update. As a still further possibility, the EDS may receive the updated statistics and/or heartbeat information from the EAS based on an aperiodic (e.g., event triggered) update configured to cause the EAS to provide the capability and performance update. For example, the EDS may configure the EAS to provide an aperiodic update if edge compute resource availability for the EAS changes (e.g., increases or decreases) such that one or more specified edge compute resources or parameters crosses a configured threshold for that type of edge compute resource or parameter, and the update could be triggered based on one or more of the specified edge compute resources or parameters crossing one of the configured thresholds.

Based on the information received from the EAS, the EDS may update its stored capability and performance information for the EAS (e.g., update the edge compute resource availability profile information for the EAS). The EDS may also determine to modify the selection of one or more edge application servers for the edge compute request of the wireless device based at least in part on the updated information, and/or may determine to provide an indication of the updated information to the wireless device to facilitate decision-making by the DOF function of the wireless device. For example, if the EDS determines that a different EAS may better meet the criteria of the edge compute request than the current EAS based on the updated capability and performance information, the EDS may determine to modify the selection of one or more edge application servers for edge compute request of the wireless device to prioritize the EAS that may better meet the criteria of the edge compute request over the current EAS. Such a scenario could occur, for example, if the resource availability from the current EAS has been degraded (e.g., due to additional loading). Note that other scenarios in which the EDS may determine that a different EAS may better meet the criteria of the edge compute request than the current EAS, which may be based on such information from the EAS, information received from the wireless device, and/or any of various other possible considerations, could include an increase in the edge compute resources needed by the wireless device above those indicated in the edge compute request, and/or mobility of the wireless device.

In 1108, the EDS may provide an indication to the wireless device of the modification to the EAS(s) selected for the wireless device's edge compute request and/or of the updated capability and performance information for the EAS. Based on the indication, the wireless device may determine to change the EAS from which it obtains edge compute resources, and may accordingly transfer session from the current EAS and connect to a different EAS. Alternatively, the current EAS may redirect session to a different EAS. Alternatively, in some instances, the wireless device may determine to not change the EAS from which it obtains edge compute resources; for example, the wireless device may determine whether the current EAS still has the best capability to meet the edge compute needs of the wireless device based on the updated capability and performance information for the EAS, and if so, the wireless device may determine to not change the EAS from which it obtains edge compute resources.

Thus, according to the techniques described herein, it may be possible to support a wireless device seeking edge compute resources in a cellular communication system to efficiently and effectively obtain those resources, at least according to some embodiments.

In the following further exemplary embodiments are provided.

One set of embodiments may include an apparatus, comprising: a processor configured to cause a device to: provide an edge compute request to an edge discovery service, wherein the edge compute request indicates one or more criteria for the edge compute request; receive a response to the edge compute request, wherein the response to the edge compute request includes an indication of one or more suggested edge application servers for the edge compute request; and connect to an edge application server indicated in the response to the edge compute request.

According to some embodiments, the device comprises a wireless device, wherein the processor is further configured to cause the wireless device to: register with a cellular network; provide a request for authorization to use edge compute resources to the edge discovery service; receive a response from the edge discovery service indicating that the wireless device is authorized to use edge compute resources.

According to some embodiments, the authorization is based on one or more of: a device identifier of the wireless device; a subscriber identifier of the wireless device; an application associated with the request for authorization to use edge compute resources; or a location of the wireless device.

According to some embodiments, the processor is further configured to cause the device to: receive an indication from the edge discovery service of a modification to the one or more suggested edge application servers for the edge compute request; and connect to a different edge application server based at least in part on the indication from the edge discovery service of a modification to the one or more suggested edge application servers for the edge compute request.

According to some embodiments, the processor is further configured to cause the device to: receive an indication from the edge discovery service of updated capability and performance information for at least one edge application server of the one or more suggested edge application servers for the edge compute request; and connect to a different edge application server based at least in part on the indication from the edge discovery service of updated capability and performance information for at least one edge application server of the one or more suggested edge application servers for the edge compute request.

According to some embodiments, the one or more criteria for the edge compute request comprise one or more of: an application associated with the edge compute request; an authentication mechanism associated with the edge compute request; a network slice identifier associated with the edge compute request; a graphics processing unit (GPU) capability associated with the edge compute request; a central processing unit (CPU) capability associated with the edge compute request; an amount of memory associated with the edge compute request; a latency associated with the edge compute request; a bandwidth associated with the edge compute request; or a geographical area associated with the edge compute request.

Another set of embodiments may include a method, comprising: by a device: storing edge compute resource availability profile information for each of a plurality of edge application servers; receiving an edge compute request from a wireless device, wherein the edge compute request indicates one or more criteria for the edge compute request; selecting one or more edge application servers for the edge compute request based at least in part on the edge compute resource availability profile information for each of a plurality of edge application servers and the one or more criteria for the edge compute request; and providing a response to the edge compute request to the wireless device, wherein the response to the edge compute request includes a prioritized list of the selected one or more edge application servers.

According to some embodiments, the method further comprises: storing application profile information indicating a set of edge compute resources associated with each of a plurality of applications or application types, wherein the one or more criteria for the edge compute request include an indication of an application or application type associated with the edge compute request; and determining, based at least in part on the edge compute resource availability profile information for each of the plurality of edge application servers, whether each of the plurality of edge application servers supports a set of edge compute resources associated with the application or application type associated with the edge compute request, wherein the one or more edge application servers are selected further based at least in part on whether each of the plurality of edge application servers supports the set of edge compute resources associated with the application or application type associated with the edge compute request.

According to some embodiments, the one or more criteria for the edge compute request comprise at least a graphics processing unit (GPU) capability, a central processing unit (CPU) capability, and an amount of memory associated with the edge compute request, wherein the method further comprises: determining, based at least in part on the edge compute resource availability profile information for each of the plurality of edge application servers, whether each of the plurality of edge application servers supports the GPU capability, CPU capability, and the amount of memory associated with the edge compute request, wherein the one or more edge application servers are selected further based at least in part on whether each of the plurality of edge application servers supports the GPU capability, CPU capability, and the amount of memory associated with the edge compute request.

According to some embodiments, the one or more criteria for the edge compute request include one or more authentication types associated with the edge compute request, wherein the method further comprises: determining, based at least in part on the edge compute resource availability profile information for each of the plurality of edge application servers, whether each of the plurality of edge application servers supports the one or more authentication types associated with the edge compute request, wherein the one or more edge application servers are selected further based at least in part on whether each of the plurality of edge application servers supports the one or more authentication types associated with the edge compute request.

According to some embodiments, the one or more criteria for the edge compute request include one or more network slices associated with the edge compute request, wherein the method further comprises: determining, based at least in part on the edge compute resource availability profile information for each of the plurality of edge application servers, whether each of the plurality of edge application servers supports the one or more network slices associated with the edge compute request, wherein the one or more edge application servers are selected further based at least in part on whether each of the plurality of edge application servers supports the one or more network slices associated with the edge compute request, wherein the response to the edge compute request further indicates a network slice identifier with which to connect in conjunction with the edge compute request.

According to some embodiments, the method further comprises: receiving updated edge compute resource availability information from an edge application server; and updating the edge compute resource availability profile information for the edge application server based at least in part on the updated edge compute resource availability information received from the edge application server.

According to some embodiments, the device comprises: a cellular network element configured to provide an edge discovery service in a third generation partnership project (3GPP) fifth generation (5G) cellular network.

Yet another set of embodiments may include a cellular network element configured to provide an edge discovery service, comprising: a network port; and a processor operably coupled to the network port; wherein the cellular network element is configured to: receive capability and performance information for each of a plurality of edge application servers; store the capability and performance information for each of the plurality of edge application servers; receive an edge compute request from a wireless device, wherein the edge compute request indicates one or more criteria for the edge compute request; select one or more edge application servers based at least in part on the capability and performance information for each of the plurality of edge application servers and the one or more criteria for the edge compute request; and provide a response to the edge compute request, wherein the response to the edge compute request includes an indication of one or more edge application servers.

According to some embodiments, the one or more criteria for the edge compute request comprise one or more of: an application associated with the edge compute request; an authentication mechanism associated with the edge compute request; a network slice identifier associated with the edge compute request; a graphics processing unit (GPU) capability associated with the edge compute request; a central processing unit (CPU) capability associated with the edge compute request; an amount of memory associated with the edge compute request; a latency associated with the edge compute request; a bandwidth associated with the edge compute request; or a geographical area associated with the edge compute request.

According to some embodiments, the cellular network element is further configured to: receive updated capability and performance information from at least one of the edge application servers; and update the stored capability and performance information based at least in part on the updated capability and performance information received from at least one of the edge application servers.

According to some embodiments, the cellular network element is further configured to: determine to modify the selection of one or more edge application servers for the wireless device based at least in part on the updated capability and performance information; and provide an indication to the wireless device of the modification to the selection of one or more edge application servers for the wireless device.

According to some embodiments, the updated capability and performance information relates to at least one edge application server indicated to the wireless device, wherein the cellular network element is further configured to: provide an indication to the wireless device of the updated capability and performance information for the at least one edge application server indicated to the wireless device.

According to some embodiments, the updated capability and performance information is received based on a scheduled periodic update.

According to some embodiments, the updated capability and performance information is received based at least in part on an aperiodic event trigger configured to cause the at least one of the edge application servers to provide a capability and performance update.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the disclosure may be realized in any of various forms. For example, in some embodiments, the subject matter described herein may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to, when executing instructions stored in a non-transitory memory, perform operations comprising:
performing authorization for connecting to an edge server;
subsequently, generating an edge compute request for transmission to the edge server, wherein the edge compute request indicates one or more criteria for the edge compute request; and
receiving a response to the edge compute request including a portion of information, wherein the portion of information includes an indication of one or more edge application servers for the edge compute request.

2. The apparatus of claim 1, wherein the portion of information is provisioned at the edge server.

3. The apparatus of claim 1, wherein the portion of information further includes network slice information.

4. The apparatus of claim 1, wherein the portion of information is related to edge application server discovery.

5. The apparatus of claim 1, the operations further comprising:
sending traffic to one or more edge application servers based at least in part on the one or more edge application servers that are indicated in the response to the edge compute request.

6. The apparatus of claim 1, wherein the indication of one or more edge application servers for the edge compute request is based on access control.

7. The apparatus of claim 1, the apparatus further comprising a radio communicatively coupled to the processor.

8. A method, comprising:
performing authorization for a user equipment (UE) to connect to an edge server;
subsequently, receiving, from the UE, an edge compute request for transmission to the edge server, wherein the edge compute request indicates one or more criteria for the edge compute request; and
transmitting, to the UE, a response to the edge compute request including a portion of information, wherein the portion of information includes an indication of one or more edge application servers for the edge compute request.

9. The method of claim 8, wherein the portion of information is provisioned at the edge server.

10. The method of claim 8, wherein the portion of information further includes network slice information.

11. The method of claim 8, wherein the portion of information is related to edge application server discovery.

12. The method of claim 8, further comprising:
receiving, from the UE, traffic to one or more edge application servers based at least in part on the one or more edge application servers that are indicated in the response to the edge compute request.

13. The method of claim 8, wherein the indication of one or more edge application servers for the edge compute request is based on access control.

14. The method of claim 8, wherein the indication of one or more edge application servers for the edge compute request is based on static provisioning.

15. A method, comprising:
performing authorization for connecting to an edge server;
subsequently, generating an edge compute request for transmission to the edge server, wherein the edge compute request indicates one or more criteria for the edge compute request; and
receiving a response to the edge compute request including a portion of information, wherein the portion of information includes an indication of one or more edge application servers for the edge compute request.

16. The method of claim 15, wherein the portion of information is provisioned at the edge server.

17. The method of claim 15, wherein the portion of information further includes network slice information.

18. The method of claim 15, wherein the portion of information is related to edge application server discovery.

19. The method of claim 15, further comprising:
sending traffic to one or more edge application servers based at least in part on the one or more edge application servers that are indicated in the response to the edge compute request.

20. The method of claim 15, wherein the indication of one or more edge application servers for the edge compute request is based on access control.

* * * * *